US012612163B2

(12) United States Patent
Coquart et al.

(10) Patent No.: US 12,612,163 B2
(45) Date of Patent: *Apr. 28, 2026

(54) SEAT PAN, IN PARTICULAR FOR AN AIRCRAFT SEAT, PROVIDED WITH A KINETIC ENERGY ABSORBING TUBE

(71) Applicant: Safran Seats, Plaisir (FR)

(72) Inventors: Maxime Coquart, Moissy-Cramayel (FR); Daniele Guerra, Moissy-Cramayel (FR); Jonathan Gajewski, Moissy-Cramayel (FR); Alexandre Debaugnies, Moissy-Cramayel (FR); Jean-Roman Batt, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 168 days.

This patent is subject to a terminal disclaimer.

(21) Appl. No.: 18/562,980

(22) PCT Filed: May 20, 2022

(86) PCT No.: PCT/EP2022/063802
§ 371 (c)(1),
(2) Date: Nov. 21, 2023

(87) PCT Pub. No.: WO2022/248372
PCT Pub. Date: Dec. 1, 2022

(65) Prior Publication Data
US 2024/0367798 A1     Nov. 7, 2024

(30) Foreign Application Priority Data
May 28, 2021     (FR) ...................................... 2105571

(51) Int. Cl.
*B64D 11/06* (2006.01)

(52) U.S. Cl.
CPC ................................ *B64D 11/0619* (2014.12)

(58) Field of Classification Search
CPC . B64D 11/0619; B64D 11/0601; B64D 11/06; B64D 11/00
See application file for complete search history.

(56) References Cited

U.S. PATENT DOCUMENTS 5,568,960 A * 10/1996 Oleson ................... B60N 2/143
297/344.22
5,636,901 A * 6/1997 Grilliot ................... B60N 2/68
248/188.1

(Continued)

FOREIGN PATENT DOCUMENTS

EP       0372338 A2     6/1990
FR       2754498 A1     4/1998

OTHER PUBLICATIONS

International Patent Application No. PCT/EP2022/063802, Written Opinion of the International Searching Authority, dated Nov. 28, 2023.

(Continued)

*Primary Examiner* — Chi Q Nguyen
(74) *Attorney, Agent, or Firm* — Kilpatrick Townsend & Stockton LLP

(57)     ABSTRACT

A seat pan can include a seat pan structure. The seat pan structure can include a first longitudinal member having a front end portion and a rear end portion, a second longitudinal member having a front end portion and a rear end portion, a front cross member mechanically interconnecting the front end portion of the first longitudinal member and the front end portion of the second longitudinal member; and a rear cross member mechanically interconnecting the rear end portion of the first longitudinal member and the rear end portion of the second longitudinal member. The seat pan (Continued)

structure can further include a kinetic energy absorbing tube extending between the first longitudinal member and the second longitudinal member.

10 Claims, 8 Drawing Sheets

(56)                    References Cited

U.S. PATENT DOCUMENTS

| | | | | |
|---|---|---|---|---|
| 5,869,472 | A * | 2/1999 | Moriarty | C07C 401/00 |
| | | | | 552/653 |
| 6,691,970 | B1 * | 2/2004 | Sutton, Sr. | B60N 2/14 |
| | | | | 248/425 |
| 8,540,313 | B2 * | 9/2013 | Fujita | B60N 2/42763 |
| | | | | 297/354.11 |
| 8,579,375 | B2 * | 11/2013 | Marais | B60N 2/02 |
| | | | | 297/341 |
| 8,827,365 | B2 * | 9/2014 | Gaither | B64D 11/06 |
| | | | | 297/316 |
| 9,227,729 | B2 * | 1/2016 | Udriste | B64D 11/06395 |
| 9,610,919 | B2 * | 4/2017 | Taubert | B60R 22/20 |
| 9,656,583 | B2 * | 5/2017 | Gaither | B64D 11/0641 |
| 9,840,170 | B2 | 12/2017 | Fujita et al. | |
| 10,486,814 | B2 | 11/2019 | Texeraud et al. | |
| 10,583,926 | B2 * | 3/2020 | Erhel | B60N 2/14 |
| 11,767,119 | B2 * | 9/2023 | Salzer | B64D 11/0638 |
| | | | | 244/118.6 |
| 2002/0053792 | A1 | 5/2002 | Yamaguchi et al. | |
| 2006/0076807 | A1 * | 4/2006 | Gaikwad | A47C 7/506 |
| | | | | 297/71 |
| 2017/0080832 | A1 | 3/2017 | Fujita et al. | |
| 2018/0290754 | A1 | 10/2018 | Schumm | |

OTHER PUBLICATIONS

International Patent Application No. PCT/EP2022/063802, International Search Report, Translation of International Search Report, and Written Opinion, dated Jul. 22, 2022.

* cited by examiner

[Fig. 1a]
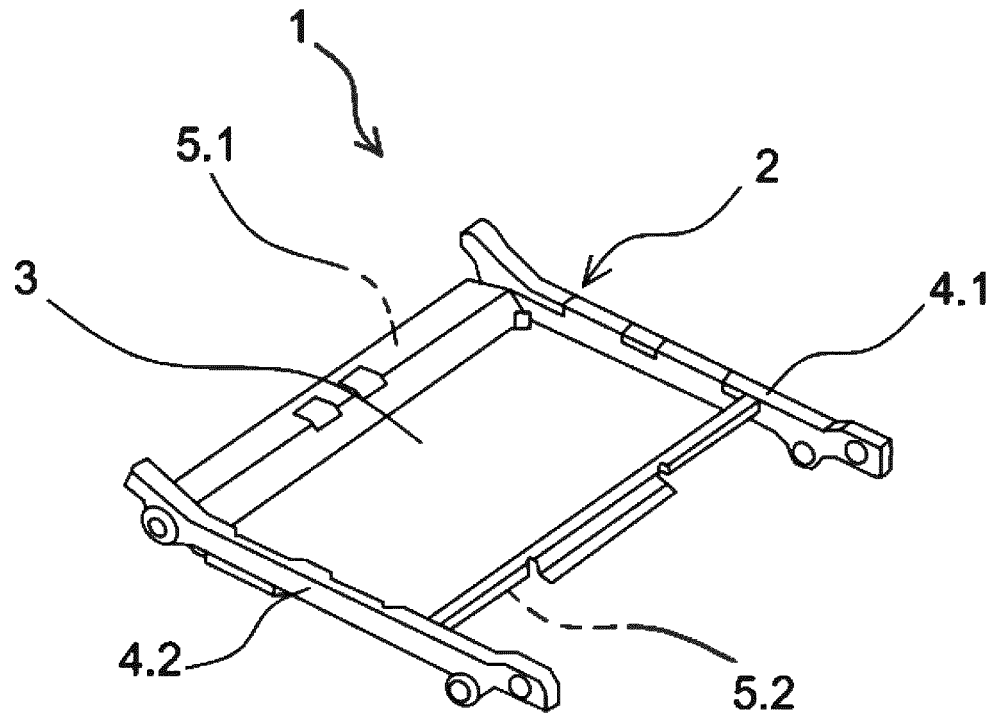
[Fig. 1b]
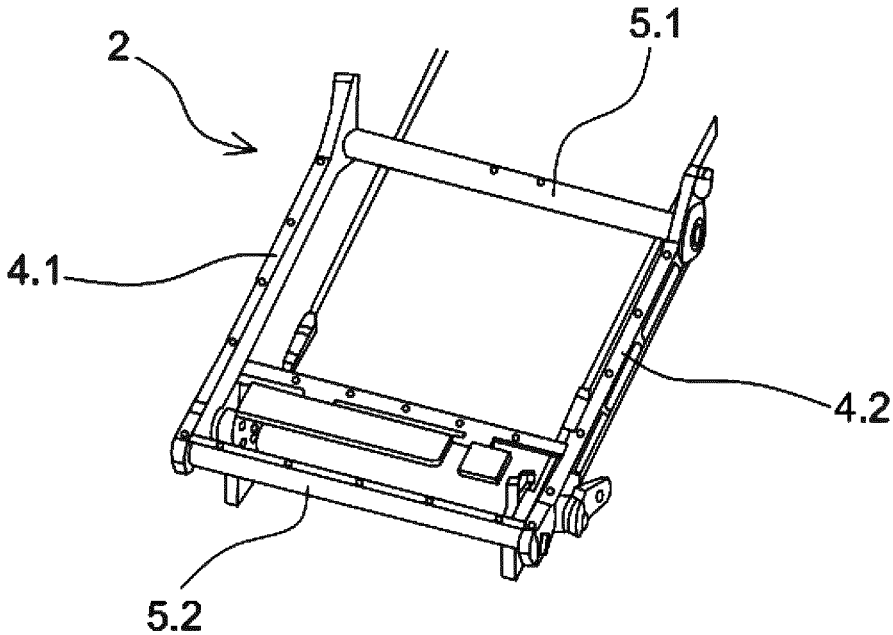

[Fig. 2a]
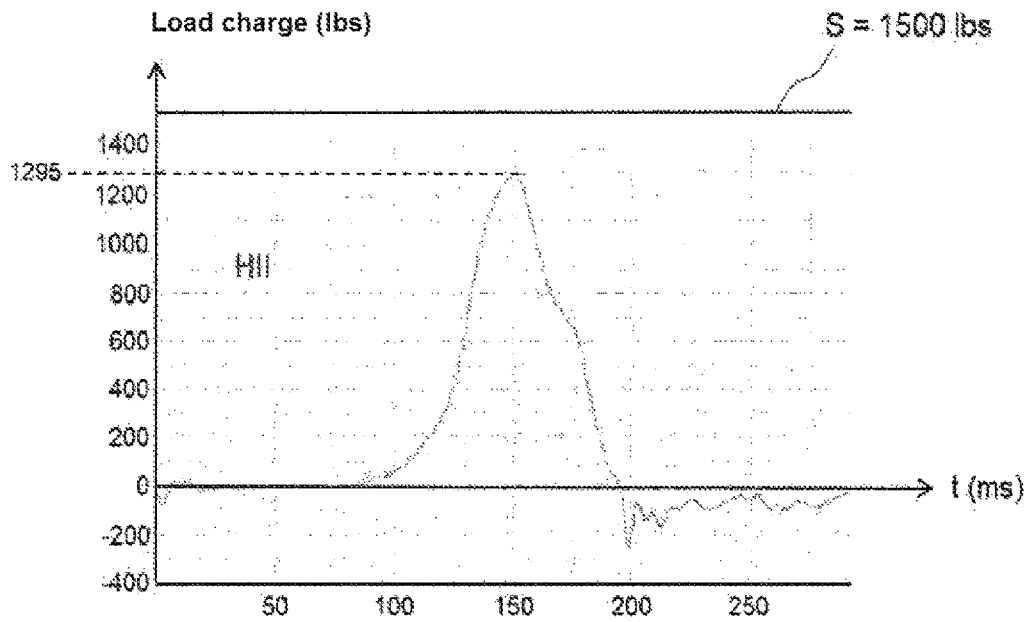
[Fig. 2b]
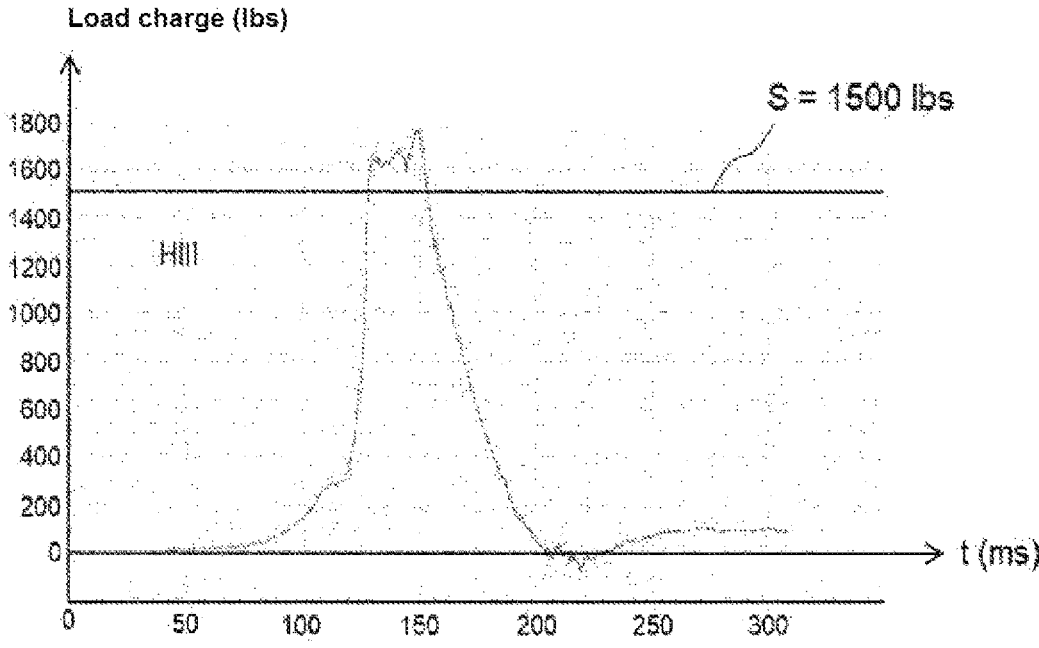

[Fig. 3a]
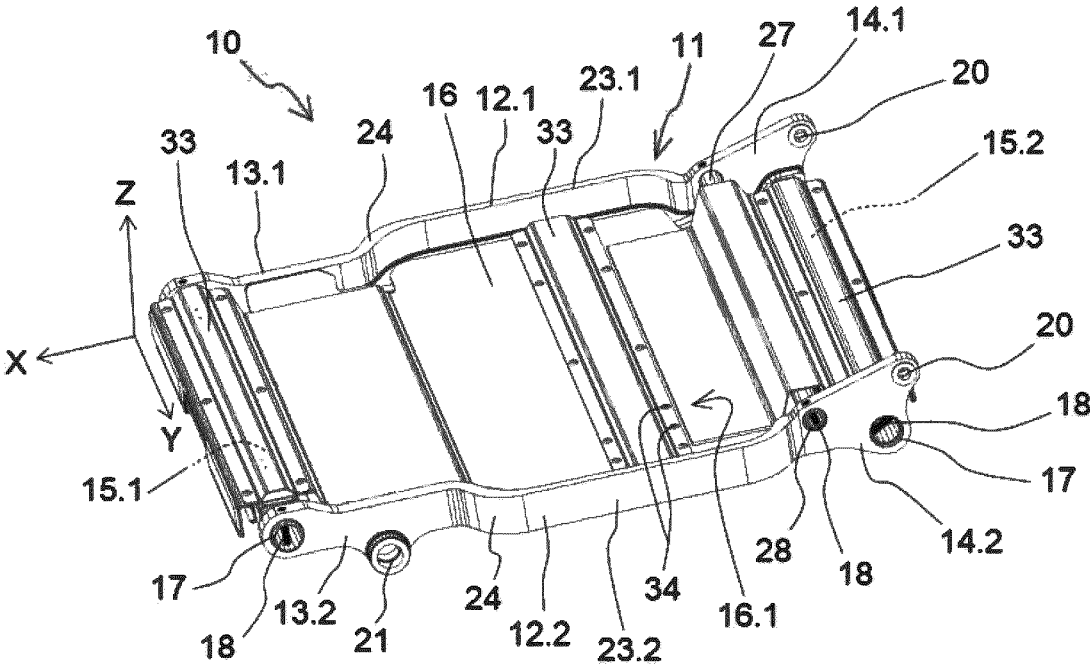
[Fig. 3b]
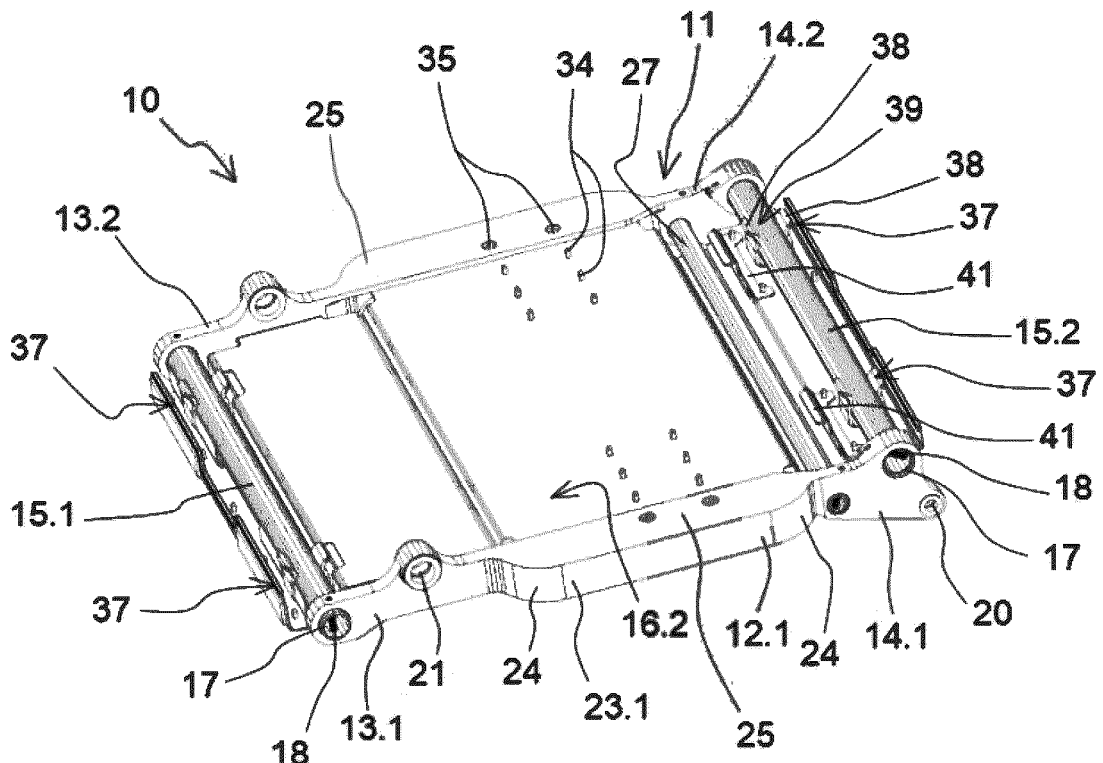

[Fig. 4a]
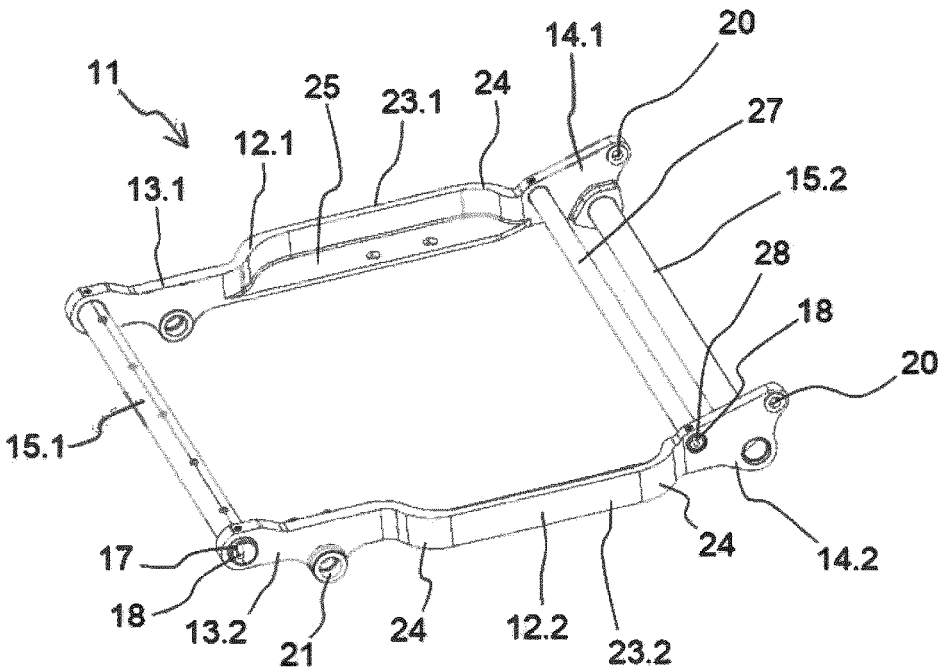
[Fig. 4b]
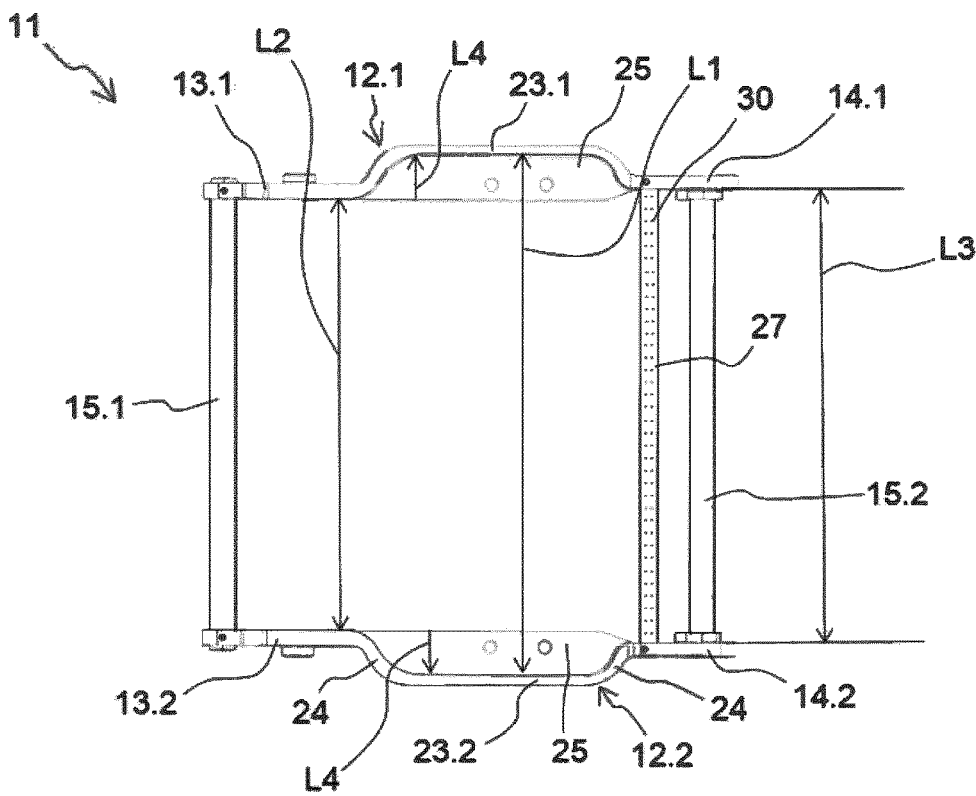

[Fig. 4c]
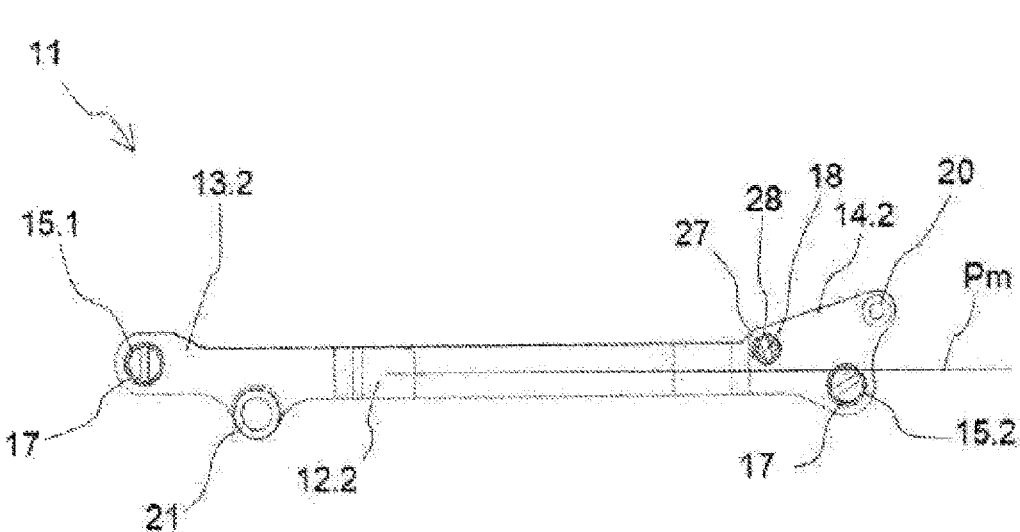
[Fig. 5]
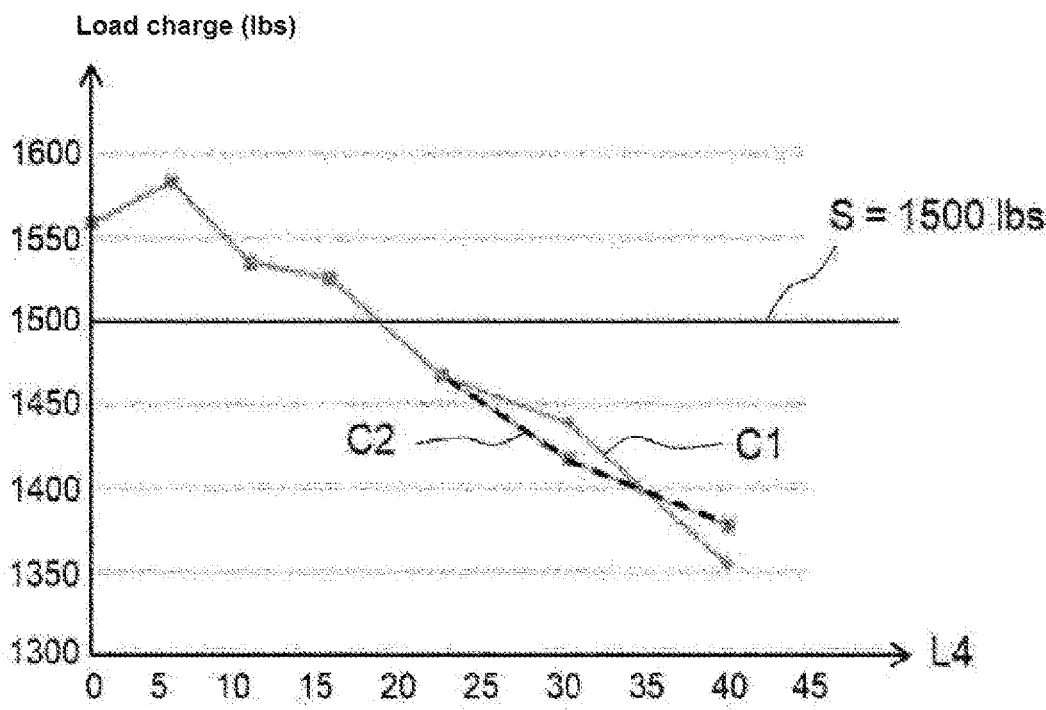

[Fig. 6]
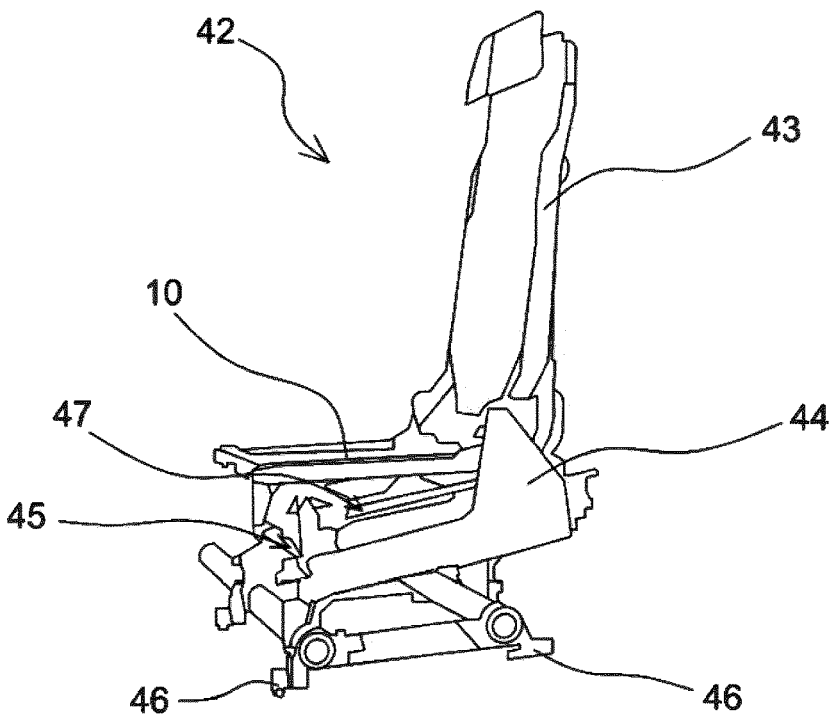
[Fig. 7]
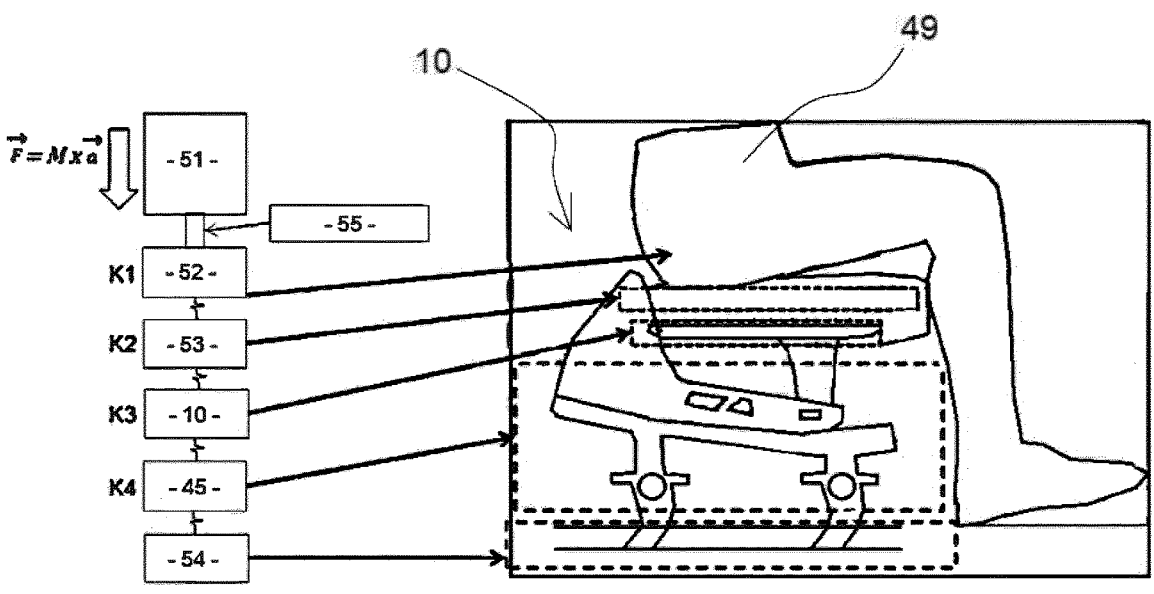

[Fig. 8]
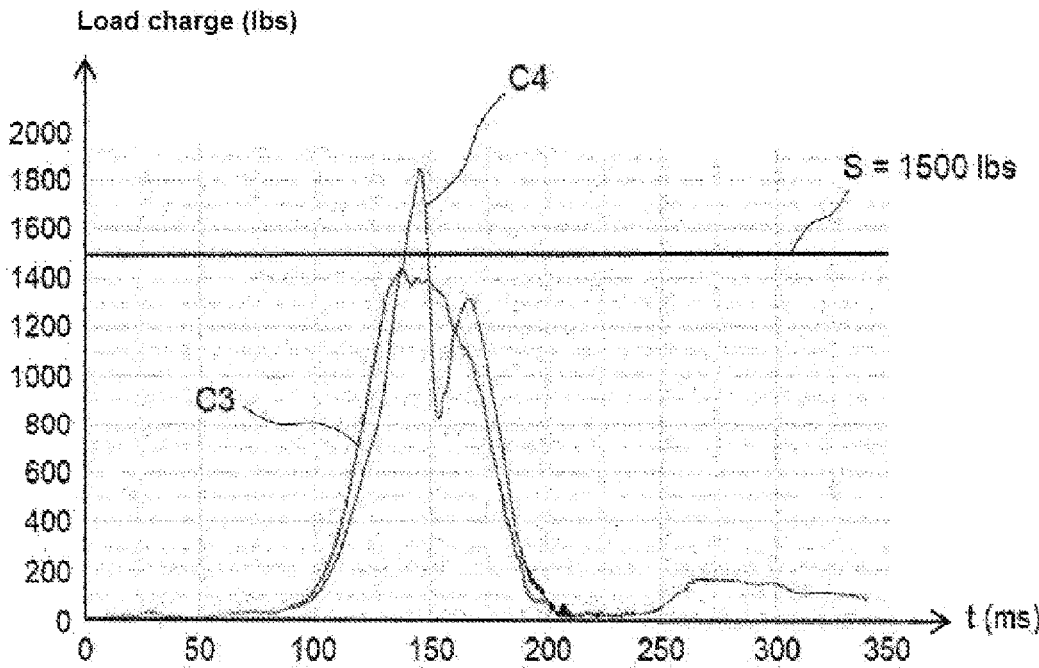
[Fig. 9]
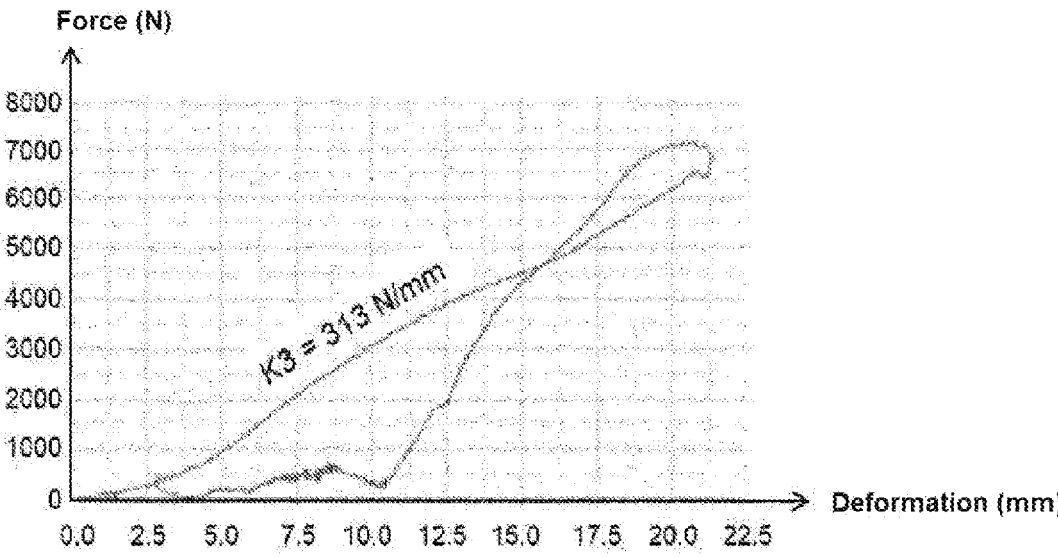

[Fig. 10]
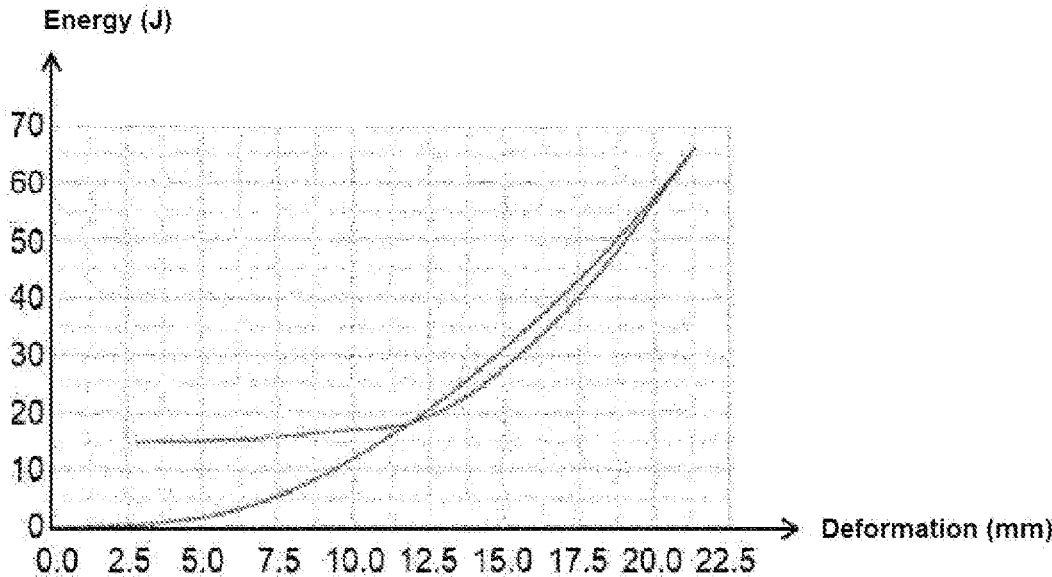

SEAT PAN, IN PARTICULAR FOR AN AIRCRAFT SEAT, PROVIDED WITH A KINETIC ENERGY ABSORBING TUBE

CROSS REFERENCE TO RELATED APPLICATIONS

This application is the United States national phase application of International Patent Application PCT/EP2022/063802 ("the '802 application"), filed on May 20, 2022 and titled "SEAT PAN, IN PARTICULAR FOR AN AIRCRAFT SEAT, PROVIDED WITH A KINETIC ENERGY ABSORBING TUBE," which application is related to and claims priority benefits of France Patent Application No. 2105571, ("the '571 application"), filed on May 28, 2021. The '802 and '571 applications are hereby incorporated in their entireties by this reference.

The present invention relates to a seating surface provided with a kinetic energy absorbing tube. The invention finds a particularly advantageous, but not exclusive, application with all kinds of aircraft seats of "economy class", "business class" and "first class" or "pilot" type as well as with helicopter seats or any other flying machine.

In a manner known per se, a seat is subjected to certification tests for checking the mechanical behavior of the seat during an impact. In a dynamic test called "14G-down", a dummy installed in the seat is subjected to a vertical deceleration of 14G. The test is validated if the lumbar load subjected to the dummy is less than a threshold S for example of 1500 lbf (i.e. 6672 N).

A standard seating surface 1 of a seat shown in FIG. 1*a* comprises a seating surface structure 2 and a seating surface plate 3 for covering the seating surface structure 2. The seating surface structure 2 shown alone in FIG. 1*b* comprises two longitudinal members 4.1, 4.2 parallel to each other. These longitudinal members 4.1, 4.2 are mechanically connected to each other by means of crossbars 5.1, 5.2.

As illustrated in FIG. 2*a* showing the evolution over time of the lumbar load observable during a "14G-down" test, such a seating surface 1 easily passes the certification test with a so-called "HII-type" dummy. Such a HII-type dummy, which has in a seated position a height of about 90 cm and a mass of about 74 kg was until then the certification standard.

With the evolution of the morphology of the population, the certification rules were modified with the use of a type-HIII dummy heavier than the type HII-dummy. Indeed, the HIII-type dummy has in the seated position a height of about 87 cm and a mass of about 78 kg. However, this change in the size of the dummy has an influence on the dynamic behavior of the seats during a "14G-down" test, so that the lumbar load subjected to the dummy exceeds the admissible e load threshold of 1500 lbf, as illustrated in FIG. 2*b*. The difference between the lumbar load subjected to a HII-type dummy and a HIII-type dummy is of the order of 300 lbf.

After detailed analyzes of this phenomenon, the inventive entity demonstrated that this increase in lumbar load is essentially due to the fact that the pelvis of the HIII-type dummy, which is wider than that of the HII-type dummy, comes into contact the with seating surface longitudinal members during the test.

The objective of the invention is in particular effectively remedy this drawback by proposing a seating surface comprising a seating surface structure comprising:
- a first longitudinal member including a front end portion and a rear end portion,

- a second longitudinal member including a front end portion and a rear end portion,
- a front crossbar mechanically connecting the front end portion of the first longitudinal member and the front end portion of the second longitudinal member to one another, and
- a rear crossbar mechanically connecting the rear end portion of the first longitudinal member and the rear end portion of the second longitudinal member to one another,
- said seating surface structure further including a kinetic energy absorbing tube extending between the first longitudinal member and the second longitudinal member.

The invention thus makes it possible, by providing a kinetic energy absorbing tube integrated into the seating surface, to relieve the lumbar load subjected to the dummy during the "14G-down" test so as to be able to validate it.

According to one embodiment of the invention, a first end of the kinetic energy absorbing tube is mechanically connected to the first longitudinal member and a second end of the kinetic energy absorbing tube is mechanically connected to the second longitudinal member.

According to one embodiment of the invention, the kinetic energy absorbing tube is arranged in the upper part of the rear end portions of the longitudinal members.

According to one embodiment of the invention, the kinetic energy absorbing tube is a hollow tube made of a metallic material, such as steel or aluminum.

According to one embodiment of the invention, the kinetic energy absorbing tube includes a plurality of grooves.

According to one embodiment of the invention, each longitudinal member further includes a distal portion extending between the corresponding front end portion and rear end portion, a distance between the first longitudinal member and the second longitudinal member, measured between the distal portions, being greater than a distance between the first longitudinal member and the second longitudinal member, measured between the front end portions, and/or a distance between the first longitudinal member and the second longitudinal member, measured between the rear end portions.

According to one embodiment of the invention, a platform is mechanically connected to a corresponding distal portion.

According to one embodiment of the invention, the seating surface further includes a seating surface plate covering at least partially a seating surface area delimited by the first longitudinal member and the second longitudinal member as well as by the front crossbar and the rear crossbar.

According to one embodiment of the invention, the seating surface plate includes at least one latching device for cooperating with a crossbar.

According to one embodiment of the invention, the seating surface plate carries at least one stop piece for bearing against a crossbar when the seating surface is subjected to a vertical impact.

The invention also relates to a seat including a seating surface as previously defined.

The present invention will be better understood and other characteristics and advantages will become apparent on reading the following detailed description comprising embodiments given by way of illustration with reference to the appended figures, presented by way of non-limiting examples, which may be used to complete the understanding of the present invention and the presentation of the realization thereof and, if necessary, contribute to the definition thereof, in which:

FIG. 1a, already described, is a perspective view of an airplane seating surface according to the state of the art;

FIG. 1b, already described, is a perspective view of an aircraft seating surface structure for a seat according to the state of the art;

FIG. 2a, already described, is a graphical representation of the evolution over time of the lumbar load observable during a "14G-down" test for an HII-type dummy in a seat including the seating surface in FIG. 1a;

FIG. 2b, already described, is a graphical representation of the evolution over time of the lumbar load observable during a "14G-down" test for a HIII-type dummy in a seat including the seating surface in FIG. 1a;

FIGS. 3a and 3b are perspective views respectively from above and below of an airplane seating surface according to the present invention;

FIGS. 4a, 4b, and 4c respectively show a perspective view, a top view, and a side view of an aircraft seating surface structure according to the present invention;

FIG. 5 is a graphical representation of a maximum lumbar load observable during a "14G-down" test carried out with a HIII-type dummy as a function of a hook-off length at a distal portion of each longitudinal member;

FIG. 6 is a perspective view of an airplane seat including a seating surface according to the present invention;

FIG. 7 illustrates the modeling of a "seat-dummy" system by a "mass-spring" type system in the context of a "14G-down" test;

FIG. 8 is a graphical representation of the evolution over time of the lumbar load observable during a "14G-down" test for a HIII-type dummy in a seat provided with a seating surface according to the invention integrating a kinetic energy absorbing tube and for a HIII-type dummy in a seat without a kinetic energy absorbing tube;

FIG. 9 is a force curve as a function of a deformation level of a kinetic energy absorbing tube integrated into the seating surface according to the present invention;

FIG. 10 is an absorbed-energy curve as a function of a level of deformation of a kinetic energy absorbing tube integrated into the seating surface according to the present invention.

It should be noted that, in FIGS. 3a, 3b, and following, the structural and/or functional elements common to the different embodiments have the same reference. Thus, unless otherwise stated, such elements have identical structural, dimensional and material properties.

Furthermore, in the remainder of the description, the relative terms such as "front", "rear", "horizontal", "vertical", are understood by reference to the common meaning that a passenger in a seat including the seating surface according to the invention. In particular, a "rear" element of the seating surface is located on the side of the backrest while a "front" element is located on the side opposite the backrest. A back-to-front orientation of the seating surface corresponds to a right-to-left orientation in FIGS. 3a and 3b.

We also define an axial direction X of the seating surface parallel to the longitudinal members, a transverse direction Y in a horizontal plane and perpendicular to the direction X, as well as a vertical direction perpendicular to the plane formed by the axes X and Y.

FIGS. 3a and 3b show an aircraft seating surface 10, including a seating surface structure 11 and a seating surface plate 16 for covering the seating surface structure 11.

More precisely, as it can be seen in FIGS. 4a to 4c, the seating surface structure 11 includes a first longitudinal member 12.1 and a second longitudinal member 12.2. The first longitudinal member 12.1 includes a front end portion 13.1 and a rear end portion 14.1. The second longitudinal member 12.2 includes a front end portion 13.2 and a rear end portion 14.2.

A front crossbar 15.1 mechanically connects the front end portion 13.1 of the first longitudinal member 12.1 and the front end portion 13.2 of the second longitudinal member 12.2 to one another. A rear crossbar 15.2 mechanically connects the rear end portion 14.1 of the first longitudinal member 12.1 and the rear end portion 14.2 of the second longitudinal member 12.2 to one another.

The mechanical connections between the longitudinal members 12.1, 12.2 and the crossbars 15.1, 15.2 can be made by means of pins, rivets, screws, or any other fixing device adapted to the application. In the example shown, a crossbar 15.1, 15.2 penetrates into a hole 17 of corresponding shape formed in an end portion of a longitudinal member 12.1, 12.2. In order to immobilize a crossbar 15.1, 15.2 in translation relative to the longitudinal members 12.2, 12.2, a pin 18 is inserted into each end of the crossbar 15.1, 15.2. A pin 18 advantageously extends in a plane perpendicular to a direction of longitudinal elongation of a crossbar 15.1, 15.2. The pins 18 are advantageously pins of elastic type.

Furthermore, the longitudinal members 12.1, 12.2 include on the side of the rear end portions 14.1, 14.2 a fixing interface 20 with a seat back. The fixing interface 20 may include a hole to be placed between two holed arms of a cover of the backrest structure. The connection of the assembly could for example be ensured by means of a shouldered screw cooperating with a corresponding nut or with an inside thread in the hole of one of the arms of the cover of the backrest structure (not shown).

The longitudinal members 12.1, 12.2 include on the side of the front end portions 13.1, 13.2 a fixing interface 21 with an element of a seating surface structure, in particular a cradle. The fixing interface 21 may include a passage hole for a rod forming an axis of rotation of the seating surface 10 relative to the seating surface structure.

Advantageously, as it is clearly visible in FIGS. 4a and 4b, each longitudinal member 12.1, 12.2 further includes a distal portion 23.1, 23.2 extending between the corresponding front end portion 13.1, 13.2 and rear end portion 14.1, 14.2. The longitudinal member 12.1 thus includes the distal portion 23.1 extending between the front end portion 13.1 and the rear end portion 14.1. The longitudinal member 12.2 includes the distal portion 23.2 extending between the front end portion 13.2 and the rear end portion 14.2.

A distance L1 between the first longitudinal member 12.1 and the second longitudinal member 12.2, measured between the distal portions 23.1, 23.2, is greater than a distance L2 between the first longitudinal member 12.1 and the second longitudinal member 12.2, measured between the front end portions 13.1, 13.2, and/or a distance L3 measured between the rear end portions 14.1, 14.2. In this case, the distance L1 is greater than the distance L2. The distance L1 is also greater than the distance L3. Each distal portion 23.1, 23.2 extends over at least 20% of the total length of the corresponding longitudinal member 12.1, 12.2. The distance L2 or L3 is for example of the order of 36 cm.

FIG. 5 shows an evolution of the lumbar load as a function of an evolution of a hook-off length L4 of a distal portion 23.1, 23.2 of each longitudinal member 12.1, 12.2 relative to an internal edge of a front end portion 13 (see FIG. 4b). This figure highlights that the greater the hook-off length L4 is, the more the lumbar load subjected to the dummy decreases. Indeed, the spacing between the two longitudinal members 12.1, 12.2 allows the pelvis to pass between the longitudinal members 12.1, 12.2. The curve C1 was obtained without any modification of stiffness of the seating surface 10 and the curve C2 shown in broken lines was obtained with a modification of the stiffness of the seating surface via the integration of a kinetic energy absorbing tube described more in detail below.

Alternatively, one of the distances L2 or L3 may be equal to the distance L1, particularly in the case where the distal portions 23.1, 23.2 are located in an extension of the front end portions 13.1, 13.2 or the rear end portions 14.1, 14.2.

A distal portion 23.1, 23.2 is connected to a corresponding end portion 13.1, 13.2 or 14.1, 14.2 of a longitudinal member via a connecting portion 24, as shown in FIGS. 4a and 4b. In the example shown, a connecting portion 24 has a rounded shape with a point of inflection corresponding to a change in direction of curvature. A connecting portion 24 thus generally has a flattened S-shape. Alternatively, a connecting portion 24 may have the shape of a ramp forming an angle of about 45 degrees relative to an end portion.

The distal portions 23.1, 23.2 of the first longitudinal member 12.1 and the second longitudinal member 12.2 have a rectilinear shape. Alternatively, the distal portions 23.1, 23.2 may have circular arc shapes or any other shape making it possible to create an increased distance between the two longitudinal members 12.1, 12.2.

Furthermore, a platform 25 is mechanically connected to a corresponding distal portion 23.1, 23.2. A platform 25 extends in a longitudinal extension of the front end portion 13.1, 13.2 and the rear end portion 14.1, 14.2 of a corresponding longitudinal member 12.1, 12.2. A platform 25 is located in a clearance space delimited by a distal portion 23.1, 23.2 as well as the connecting portions 24 at each end of the distal portion 23.1, 23.2. A platform 25 forms a bearing zone for a seating surface stiffener described in more detail below. A platform 25 has a reduced thickness compared to that of the longitudinal members 12.1, 12.2.

Advantageously, the longitudinal members 12.1, 12.2 and the crossbars 15.1, 15.2 are made of a metallic material. According to an exemplary embodiment, the longitudinal members 12.1, 12.2 could be made of aluminum, while the crossbars 15.1, 15.2 take the form of tubes made of steel. Alternatively, the longitudinal members 12.1, 12.2 and the crossbars 15.1, 15.2 are made of the same metallic material. Alternatively, the longitudinal members 12.1, 12.2 and the crossbars 15.1, 15.2 could be made of a material other than metal, such as a composite material loaded with fibers, or any other material suitable for the application.

Furthermore, as it can be seen in FIGS. 3b and 4a, a kinetic energy absorbing tube 27 extends between the first longitudinal member 12.1 and the second longitudinal member 12.2. A first end of the tube 27 is mechanically connected to the first longitudinal member 12.1 and a second end of the tube 27 is mechanically connected to the second longitudinal member 12.2.

The ends of the tube 27 are preferably connected to the rear end portions 14.1, 14.2 of the first longitudinal member 12.1 and the second longitudinal member 12.2. As for the connection between the crossbars 15.1, 15.2 and the longitudinal members 12.1, 12.2, the mechanical connection of the tube 27 with the longitudinal members 12.1, 12.2 can be carried out by means of pins 18 passing right through the tube 27 inserted in holes of reception 28 provided in the longitudinal members 12.1, 12.2. The pins 18 extend in a plane perpendicular to a direction of longitudinal elongation of the tube 27. Alternatively, the mechanical connection could be made by means of screws, rivets, by welding or any other fixing means adapted to the application.

The objective of the tube 27 is to absorb at least part of the kinetic energy of the dummy by mechanical deformation during a "14G-down" test.

Advantageously, the tube 27 is made of a metallic material, such as steel or aluminum. The tube 27 is a hollow tube whose thickness can be adapted according to the desired rigidity. The thickness of the tube 27 is particularly adapted according to the selected material.

According to an exemplary embodiment, the tube 27 is a tube made of steel having a thickness of about 2 mm and a diameter of about 14 mm. By "about", we mean a possible variation of 10% around the indicated value. The tube 27 here has a round section but it could alternatively have a section of square, rectangular, triangular, oval shape, or any other geometric shape adapted to the application.

Advantageously, as it can be seen in FIG. 4c, the tube 27 is arranged in the upper part of the rear end portions 14.1, 14.2, that is to say that the tube 27 is preferably arranged above a median horizontal plane Pm of the longitudinal members 12.1, 12.2. This makes it possible to reduce the initial distance separating the pelvis of the dummy from the tube 27 of the first rigid element of the seating surface 10 on the force path. This reduces the speed of the pelvis during deceleration and therefore the kinetic energy to be dissipated.

The kinetic energy absorbing tube 27 also makes it possible to divert the pelvis of the dummy from its vertical trajectory during a "14G-down" test by generating a speed component along the X axis. This reduces the energy to be absorbed by the tube 27 in the vertical direction Z.

According to a particular embodiment shown in FIG. 4b, the kinetic energy absorbing tube 27 may include a plurality of grooves 30. A groove 30 is made in a direction perpendicular to an axis of the tube 27. Such a configuration makes it possible to mechanically weaken the tube 27 so as to allow more deformation of the tube 27.

As it can be seen in FIGS. 3a and 3b, the seating surface plate 16 covers at least partly the seating surface area delimited by the first longitudinal member 12.1 and the second longitudinal member 12.2 as well as by the front crossbar 15.1 and the rear crossbar member 15.2. The seating surface plate 16 includes an upper face 16.1 against which a seating surface cushion can be pressed and a lower face 16.2 opposite the upper face. The seating surface plate 16 is made of a metallic material having a thickness between 0.5 mm and 1.5 mm and preferably of about 0.8 mm.

The seating surface plate 16 carries at least one stiffener 33 extending in a direction parallel to the crossbars 15.1, 15.2. A stiffener 33 preferably extends across the entire width of the seating surface plate 16. A stiffener 33 may be formed by a piece of sheet metal folded into a U or omega shape. In this case, the seating surface plate 16 includes three stiffeners 33 arranged respectively in the front part, in the rear part, and in an intermediate part of the seating surface plate 16. The stiffeners 33 are secured to the upper face of the seating surface 10 by means of through fixing studs 34.

The intermediate stiffener 33 includes ends, each bearing against a corresponding platform 25. The intermediate stiffener 33 has a length substantially equal to the distance L1. The platform 25 may include holes 35 for the passage of the fixing studs 34 of the intermediate stiffener 33, as shown in FIG. 3b.

In order to allow easy disassembly of the seating surface plate 16 to access a kinematics arranged under the seat, the seating surface plate 16 includes at least one, in this case two, latching devices 37 for cooperating respectively with the front crossbar 15.1 and the rear crossbar 15.2 of the seat. For this purpose, each latching device 37 includes two elastically deformable tabs 38 delimiting a groove 39 for receiving a corresponding crossbar 15.1, 15.2. The tabs 38 may have slopes at each of their free ends to facilitate insertion of the crossbar. The tabs 38 thus have an omega shape (Ω). It is also possible to integrate hinges to facilitate the movement of the seating surface plate 16 relative to the seating surface structure 11.

As it can be seen in FIG. 3*b*, the seating surface plate 16 also carries at least one stop piece 41 for bearing against a crossbar when the seating surface 10 is subjected to a vertical impact. The stop piece 41 is fixed to the lower face 16.2 of the seating surface 10. The objective of the stop part 41 is to retain the seating surface plate 16 to prevent the vertical collapse thereof during an impact. In the example shown, the seating surface 10 includes two stop pieces 41 for bearing against the rear crossbar 15.2 during a downward movement of the seating surface plate 16 subjected to a vertical impact.

A stop piece 41 may have an L shape facing the rear crossbar 15.2. The folded end portion of the L can thus bear against the rear crossbar 15.2 when the seating surface plate 16 moves downwards. When the seating surface plate 16 is not deformed, the stop part 41 is located at a distance from the crossbar 15.2 against which the stop part 41 is intended to bear due to a downward deformation of the seating surface plate 16.

FIG. 6 shows an airplane seat 42 including a seating surface 10 according to the invention as well as a backrest 43. The seating surface 10 is mounted on a cradle 44 associated with a low structure 45 provided with locks 46 allowing the seat 42 to be fixed on rails in an airplane cabin.

The seat 42 is advantageously provided with a kinematics 47 carried by the low structure 45 of the seat 42. This kinematics 47 makes it possible to move the seating surface 10 and the backrest 43 of the seat 42 between a "seated" position, in which the seat 42 is configured to define a seated position for a passenger, and a "lying" position, in which the seat 42 is configured to define a sleeping surface for the passenger, advantageously substantially horizontal. Intermediate comfort positions are also offered, such as the "relax" position in which the backrest 43 is strongly inclined.

In order to predict the dynamic behavior of the seat 42 during a "14G down" test, the "seat 42-dummy 49" system shown in FIG. 7 is modeled by a system of "mass-spring" type. We thus consider that the assembly 51 formed by the head and shoulders of a HIII-type dummy 49 has a mass of about 35 kg, and that the pelvis 52 has a mass of about 12 kg and a predetermined stiffness $K1$ of about 300 N/mm. A seating surface cushion 53 has a stiffness $K2$ of about 100 N/mm, while the seating surface 10 has a stiffness $K3$ to be optimized. The low structure 45 has a stiffness $K4$ of about 600 N/mm. It is considered that the floor of the aircraft 54 on which the seat 42 is mounted via fixing rails has an infinite stiffness. The lumbar load is measured by means of a sensor 55 placed at the level of the spine above the pelvis of the dummy 49. The subjected force F is equal to the product of the mass M and the deceleration a.

By adapting the configuration (material and dimensions) of the kinetic energy absorbing tube 27, it is possible to adapt the coefficient $K3$ of the seating surface 10 so as to minimize the lumbar load subjected to the dummy 49 during the test.

For the aforementioned tube 27 made of steel and having a thickness of 2 mm and a diameter of 14 mm, FIG. 8 highlights that the lumbar load observable during a "14G-down" test is well below the limit threshold S of 1500 (see curve C3 presenting a peak at 1452 lbs) while this lumbar load is well above the limit threshold S for a standard seat 42 whose seating surface 10 does not have a kinetic energy absorbing tube 27 (see curve C4).

The force curve as a function of the displacement of the kinetic energy absorbing tube 27 shown in FIG. 9 highlights an adapted stiffness $K3$ of about 313 N/mm. The energy curve shown in FIG. 10 corresponds to an integration of the curve in FIG. 9 with respect to a displacement. The energy curve shows that tube 27 is capable of absorbing 66 Joules during the "14G-Down" test, which represents approximately 75% of the kinetic energy of the dummy 49 during deceleration.

In certain embodiments, it is possible to use the kinetic energy absorbing tube 27 without the seating surface configuration 10 with longitudinal members with locally increased spacing to allow the passage of the pelvis, that is to say to implement a seating surface 10 without any distal portions 23.1, 23.2 but integrating a tube 27.

In certain embodiments, it is possible to provide a seating surface 10 including the distal portions 23.1, 23.2 to facilitate the passage of the pelvis of the dummy during the "14G-down" test but without any tube 27 absorbing kinetic energy.

Of course, the different characteristics, variants and/or embodiments of the present invention can be associated with each other in various combinations as long as they are not incompatible of each other or exclusive from each other.

Furthermore, the invention is not limited to the embodiments described above and provided solely by way of example. It encompasses various modifications, alternative forms and other variants that those skilled in the art may consider in the context of the present invention and in particular all combinations of the different modes of operation described above, which can be taken separately or in combination.

The invention claimed is:

1. A seating surface including a seating surface structure comprising:
   a first longitudinal member including a front end portion and a rear end portion,
   a second longitudinal member including a front end portion and a rear end portion,
   a front crossbar mechanically connecting the front end portion of the first longitudinal member and the front end portion of the second longitudinal member to one another, and
   a rear crossbar mechanically connecting the rear end portion of the first longitudinal member and the rear end portion of the second longitudinal member to one another, wherein said seating surface structure further includes a kinetic energy absorbing tube extending between the first longitudinal member and the second longitudinal member,
   wherein said kinetic energy absorbing tube is arranged in an upper part of the rear end portions of the first and second longitudinal members above a median horizontal plane (Pm) of the first and second longitudinal members.

2. The seating surface according to claim 1, wherein a first end of the kinetic energy absorbing tube is mechanically connected to the first longitudinal member and a second end of the kinetic energy absorbing tube is mechanically connected to the second longitudinal member.

3. The seating surface according to claim 1, wherein the kinetic energy absorbing tube is a hollow tube made of a metallic material.

4. The seating surface according to claim 1, wherein the kinetic energy absorbing tube includes a plurality of grooves.

5. The seating surface according to claim 1, wherein each longitudinal member further includes a distal portion extending between the corresponding front end portion and rear end portion, a distance between the first longitudinal member and the second longitudinal member, measured between the distal portions, being greater than a distance between the first longitudinal member and the second longitudinal member, measured between the front end portions, and/or a distance between the first longitudinal member and the second longitudinal member, measured between the rear end portions.

6. The seating surface according to claim 5, wherein a platform is mechanically connected to a corresponding distal portion.

7. The seating surface according to claim 1, wherein said seating surface further includes a seating surface plate covering at least partly a seating surface area delimited by the first longitudinal member and the second longitudinal member as well as the front crossbar and the rear crossbar.

8. The seating surface according to claim 7, wherein the seating surface plate includes at least one latching device for cooperating with a crossbar.

9. The seating surface according to claim 8, wherein the seating surface plate carries at least one stop piece for bearing against a crossbar.

10. A seat including a seating surface as defined according to claim 1.

\* \* \* \* \*